United States Patent [19]
Kawase et al.

[11] 3,982,847
[45] Sept. 28, 1976

[54] APPARATUS FOR LOCKING GUIDE VANES OF WATER WHEEL TURBINES OR PUMPS

[75] Inventors: Yozo Kawase, Machida; Yoshiyasu Mitsuhashi, Yokohama, both of Japan

[73] Assignee: Tokyo Shibaura Denki Kabushiki Kaisha (also known as Tokyo Shibaura Elec. Co., Ltd.), Japan

[22] Filed: Mar. 4, 1975

[21] Appl. No.: 555,096

[30] Foreign Application Priority Data
Mar. 8, 1974  Japan .............................. 49-26252

[52] U.S. Cl. .................................... 415/9; 403/2; 415/118; 416/2
[51] Int. Cl.² ....................................... F01B 25/26
[58] Field of Search .................. 415/9, 118; 416/2; 403/2

[56] References Cited
UNITED STATES PATENTS

| | | | |
|---|---|---|---|
| 1,585,862 | 5/1976 | Jessop | 415/9 |
| 1,641,755 | 9/1927 | Gross et al. | 415/9 |
| 1,725,421 | 8/1929 | Rogers | 415/9 |
| 1,728,898 | 9/1929 | Gross | 415/9 |
| 3,060,706 | 10/1962 | Hess | 415/9 |
| 3,388,889 | 6/1968 | Willi | 415/9 |
| 3,408,049 | 10/1968 | Willi | 415/9 |

FOREIGN PATENTS OR APPLICATIONS

| | | | |
|---|---|---|---|
| 868,355 | 5/1961 | United Kingdom | 415/9 |

*Primary Examiner*—C. J. Husar
*Attorney, Agent, or Firm*—Stevens, Davis, Miller & Mosher

[57] ABSTRACT

In a water wheel turbine or pump in which a guide vane arm is connected to a link through a fracturable pin, a plurality of recesses are provided in the cover of the water wheel turbine or pump along the path of movement of the pin for receiving the fractured portion of the pin thereby locking the guide vane arm to the cover.

9 Claims, 5 Drawing Figures

APPARATUS FOR LOCKING GUIDE VANES OF WATER WHEEL TURBINES OR PUMPS

BACKGROUND OF THE INVENTION

This invention relates to a locking device of a guide vane of a water wheel turbine or pump and more particular to an improved locking device for preventing the oscillation of the guide vane arm or generating an alarm signal when a fracturable pin interconnecting a guide vane arm and a link connected to a guide ring fractures.

The guide vanes of a water wheel turbine or pump are generally driven synchronously by a guide ring through guide vane arms and links. Thus for example, as shown in FIG. 1, the shaft of a guide vane GV is secured to one end of a guide vane arm 1 and the opposite end of the arm 1 is connected to a guide ring GR through fracturable pins 3 and a link 2. The fracturable pins 3 fracture under an excessive shearing force for protecting other guide vanes.

When one or both fracturable pins 3 fracture the guide vane becomes free so that water causes it to vibrate abnormally resulting in the damage of adjacent guide vanes and links.

SUMMARY OF THE INVENTION

Accordingly, it is an object of this invention to provide improved apparatus for locking a guide vane arm to the cover of the water wheel turbine or pump when a fracturable pin associated with the guide vane arm fractures by utilizing the fractured portion of the pin.

Another object of this invention is to provide an improved fracturable pin provided with means for detecting the fracture or cracking thereof.

According to this invention there is provided apparatus for locking a guide vane of a water wheel turbine or pump comprising a guide vane, a guide vane arm with one end connected to the shaft of the guide vane, a link with one end connected to the other end of the arm through a fracturable pin and the other end connected to a guide ring, and a plurality of recesses formed in the cover of the water wheel turbine or pump along the path of movement of the fracturable pin for receiving the fractured portion of the pin thereby locking the guide vane arm to the cover.

The fracturable pin is made hollow to contain detection liquid and a float switch for detecting the fracture or cracking of the pin.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
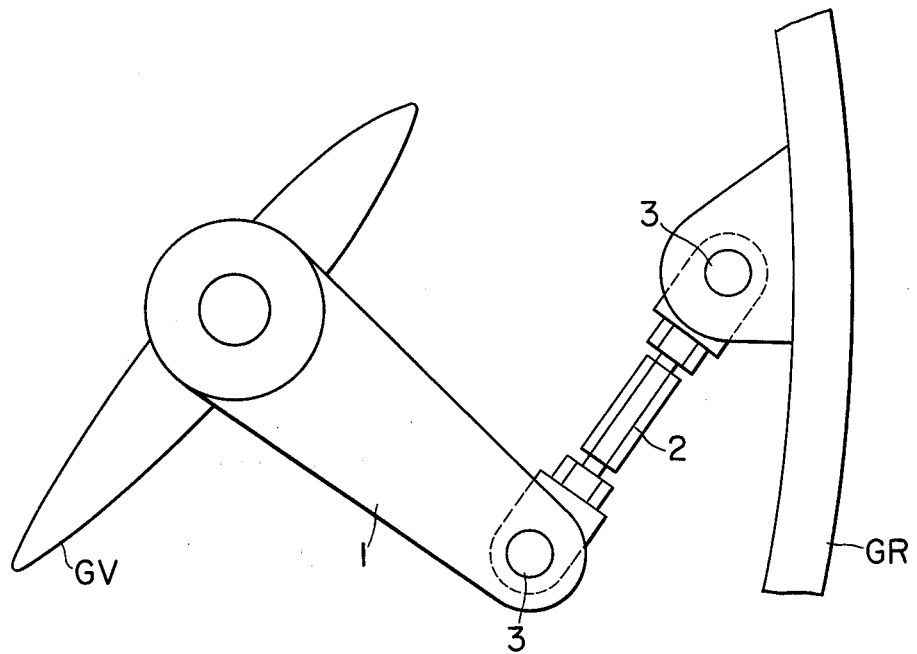
FIG. 1 is a plan view of a guide vane and a guide ring to which the invention is applicable.
Figure 2:
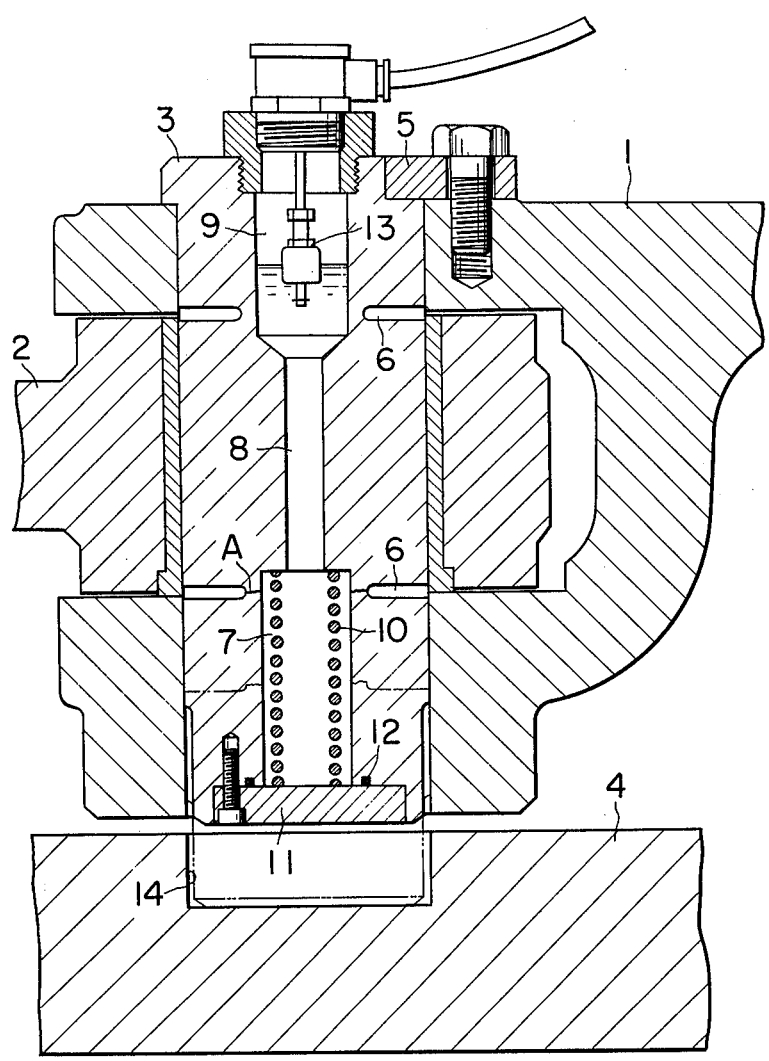
FIG. 2 is a longitudinal sectional view of a locking device of a guide vane constructed in accordance with the invention.

With reference now to FIG. 2, there is shown one end of a guide vane arm 1 whose opposite end is secured to the shaft of a guide vane GV as shown in FIG. 1. The arm 1 is connected to one end of a link 2 by means of the locking device of this invention. As shown in FIG. 1, the opposite end of the link 2 is connected to a guide ring GR through a fracturable pin.

The depicted ends of the arm 1 and link 2 are coupled together by means of a fractuable pin 3 such that they can move in the horizontal direction in a space above a upper cover 4 of the water wheel turbine or pump.

A portion of the upper end of the fracturable pin 3 is notched to receive a key 5 for preventing dropping and rotation of the pin 3. Longitudinally spaced transverse slits 6 are provided for the fracturable pin 3 at the horizontal contact surfaces between the bifurcated end of the arm 1 and the link 2 for weakening the mechanical strength of the pin 3. Accordingly, the pin 3 will fracture at the slits when it is subjected to an excessive shearing load. Inside the pin 3 are formed a spring chamber 7 at the bottom, an intermediate opening 8 and a detection chamber 9 at the top which are in axial alignment. A helical spring 10 is contained in the spring chamber 7, the spring being maintained in a compressed condition by a bottom lid 11 secured to the lower end of the pin 3. An O-ring 12 is provided between the lower end of the pin and the bottom lid 11 to seal the spring chamber 7.

The spring chamber 7, opening 8 and the detection chamber 9 are filled with detection liquid such as turbine oil to a level at about the axial center of the detection chamber 9. A liquid level detector, for example a float switch 13, is contained in the upper portion of the detection chamber and connected to an alarm device, not shown. Accordingly, as the liquid level falls down, the float switch 13 operates to actuate the alarm device.

A plurality of recesses 14 each having a diameter slightly larger than the outer diameter of the lower end of the pin 3 are formed on the upper surface of the upper cover 4 along the path of movement of the pin.

During the closing operation of the guide vanes, when a foreign substance is jammed between guide vanes an excessive shearing force will be applied to the fracturable pins 3 associated with such guide vanes whereby the fracturable pins will fracture at the weak points A at the bottoms of the grooves 6. After fracture, the lower portion of the pin 3 will fall down into one of the recesses 14 under its weight and the force of the compression spring 10, thus locking the arm 1 to the upper cover 4. At the same time, the detection liquid flows outwardly with the result that the float switch 13 actuates the alarm device informing that a fracturable pin 3 has fractured. Even when the pin does not fracture completely but merely cracked, the detection liquid will leak through such crack or cracks to operate the alarm device. In such case, the cracked pin can be exchanged with new one before it fractures completely.

Figure 3:
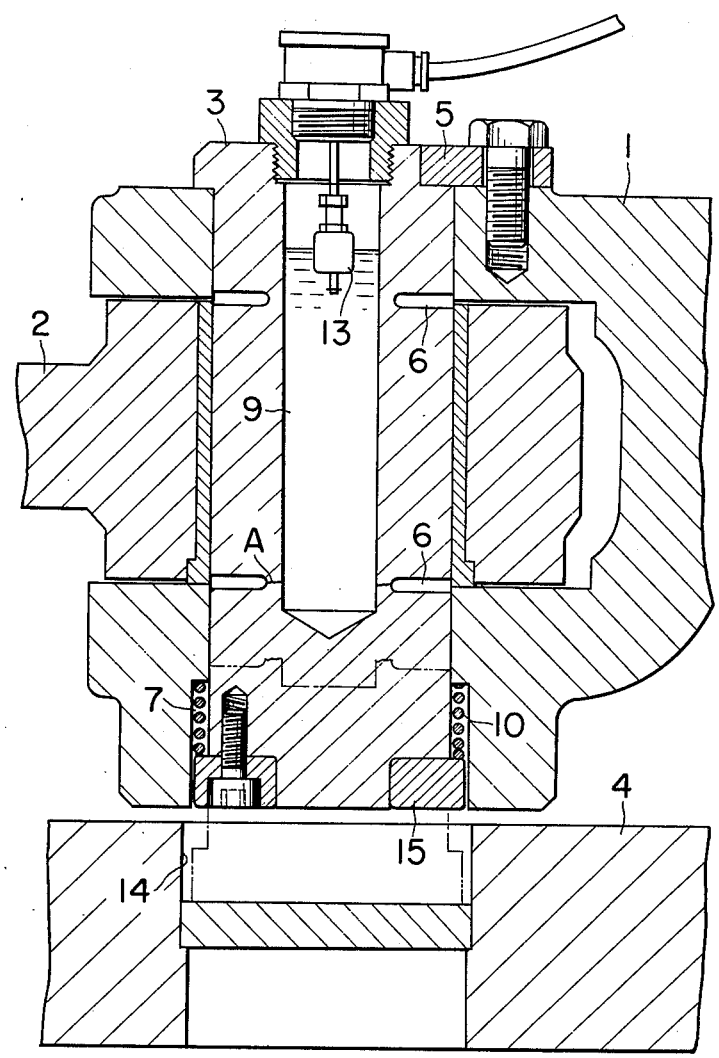
FIGS. 3, 4 and 5 are longitudinal sectional views of modified locking devices.

FIG. 3 shows a modification of the invention in which elements corresponding to those shown in FIG. 2 are designated by the same reference numerals so that only elements different from those shown in FIG. 2 will be described as follows.

In this embodiment, the spring chamber 7 is formed in the arm 1 to surround the lower portion of the fracturable pin 3 and a compression spring 10 is contained in the spring chamber 7. The lower end of the spring 10 is received by a ring 15 secured to the lower end of pin 3. The bottom of the detection chamber 9 formed in the upper portion of the pin 3 is closed but the length of the detection chamber 9 is enough to bridge both slits 6 so that when the pin 3 fractures at weak point A near lower slit 6 the portion of the pin 3 beneath the weak point A falls down into recess 14 thus locking the arm 1 to the upper cover 4 to prevent oscillation of the arm.

Figure 4:
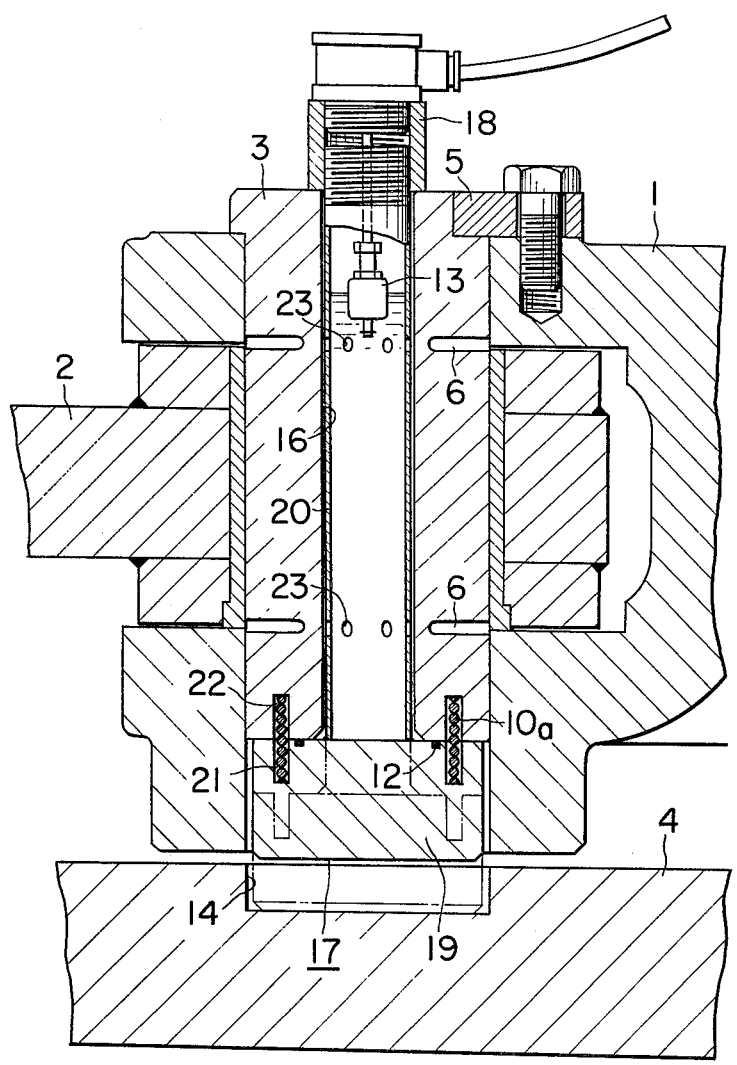
Figure 5:
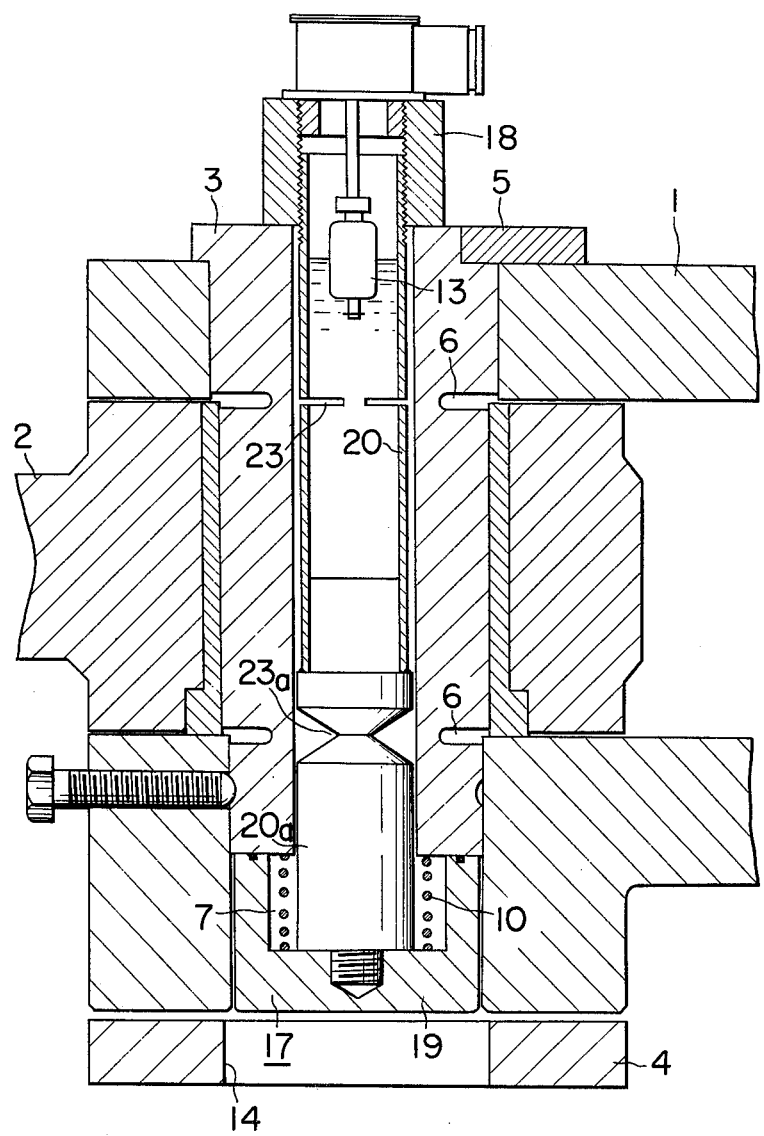

In another embodiments shown in FIGS. 4 and 5, the fracturable pin 3 is formed to be hollow for accomodating a locking pin. In FIG. 4, the fracturable pin 3 is provided with an opening 16 having a uniform diameter throughout its length. A locking pin 17 comprising an enlarged head 19 at the lower end and a tubular stem 20 welded thereto is inserted in the opening 16 from under. The upper end of the stem 20 projecting above the upper end of the fracturable pin 3 is clamped thereto by a nut 18. Vertically aligned annular grooves 21 and 22 are formed in the head 19 and the lower end of the fracturable pin 3 on the opposite sides of the contact surface therebetween. A compression spring 10a is contained in these grooves 21 and 22. A plurality of small openings 23 are formed through the tubular stem 20 at portions corresponding to the slits 6 to form weak points. Turbine oil is filled in the tubular stem 20 to a level shown in the drawing and float switch 13 is floated on the turbine oil as in the preceding embodiment.

When an excessive shearing force is applied upon the fracturable pin 3 it will fracture at the slits 6 and the tubular stem 20 also fractures at the position of small openings 23. Then the head 19 falls down under its own weight and the force of the spring 10a to fit in one of the recesses 14 thus locking the arm 1 to the cover 4. In another embodiment shown in FIG. 5 a cylindrical body 20a welded to the lower end of the tubular stem 20 is screwed into the head 19 of locking pin 17 and the spring chamber 7 is formed to surround the cylindrical body 20a for accomodating a coil spring 10 under compression. An additional weak point in the form of a groove 23a may be provided for the cylindrical body 20a.

When one of the weak points 23 and 23a fractures the portion of the pin below the fractured weak point falls down under the force of the spring 10 so as to fit the head 19 in recess or opening 14 of the cover 4.

In some cases, spring 10 may be omitted in which case the fractured portion falls down under its own weight. Instead of using a float switch for detecting fracture or cracking of the fracturable pin any other well known detection device responsive to conduction and nonconduction of electric current or loss of pressure can be used.

It will be clear that the invention provides an improved fracturable pin constructed such that when it fractures under an excessive shearing force the portion thereof beneath the weak point drops into a recess of the upper cover thus locking the guide vane arm to the cover. Accordingly, the guide vane arm is prevented from oscillating but other guide vanes whose fracturable pins are not fractured can operate to open and close the guide vanes.

In this manner, as the fractured portion of the fracturable pin is used to lock the guide vane arm to the cover for preventing the oscillation of the arm, it is possible to simplify the construction. The existing fracturable pins can readily be substituted by the novel fracturable pin. It is also easy to exchange a fractured pin with a new one.

Further, as the detection liquid is filled in the fracturable pin for the purpose of detecting fracture or cracking thereof by the lowering of the liquid level it is possible to detect the damage of the fracturable pin at an early stage.

We claim:
1. Apparatus for locking a guide vane to a cover of a hydraulic turbine or pump, comprising:
   a guide vane;
   a guide vane arm coupled to said guide vane for controlling movement of said vane;
   linkage means coupled to a guide ring;
   a fracturable member coupling said guide vane arm to said linkage means; and
   a hydraulic turbine or pump cover having at least one recess in vertical alignment with said fracturable member for receiving a portion of said fracturable member upon fracture thereof to lock said guide vane arm to said cover to thereby prevent relative movement between said arm and said cover.

2. The apparatus according to claim 1, wherein said cover contains a plurality of recesses located along the path of movement of said fracturable member for receiving said portion of said fracturable member.

3. The apparatus according to claim 1, further comprising means coupled to said fracturable member for detecting the fracture thereof.

4. The apparatus according to claim 3, wherein said fracturable member comprises a pin having an axial chamber formed at least partially therethrough and a detection fluid contained in said axial chamber; and said detecting means comprises a float switch for detecting the level of said fluid in said chamber.

5. The apparatus according to claim 1, further comprising:
   at least one annular slit formed in said fracturable member to provide a weak point; and
   spring means coupled to said fracturable member for urging the portion of said member below said weak point toward and into said recess in said cover upon fracture of said member.

6. The apparatus according to claim 5, wherein said guide vane arm is bifurcated, said fracturable member extends through the bifurcated end of said arm and said weak point is provided at a point at which said fracturable member extends through said bifurcated end.

7. The apparatus according to claim 1 wherein said fracturable member is hollow and wherein said apparatus further comprises a locking pin including a hollow tubular stem contained in said fracturable member and an enlarged head engaging the lower end of said fracturable member, spring means interposed between said enlarged head and the lower end of said fracturable member, and means for clamping the upper end of said hollow tubular stem to the upper end of said fracturable member.

8. The apparatus according to claim 7 wherein detection liquid is filled in said hollow tubular stem and a float switch is contained in said hollow tubular stem for detecting the level of said detection liquid.

9. The apparatus according to claim 7 wherein said tubular hollow stem is provided with a weak point at a point corresponding to the weak point of said fracturable member so that the tubular hollow stem also breaks when an excessive stress is applied thereto.

* * * * *